United States Patent
Grant et al.

(10) Patent No.: US 6,551,042 B1
(45) Date of Patent: Apr. 22, 2003

(54) SPRING COLLET CLAMP AND METHOD

(75) Inventors: Anthony J. Grant, Grafton, WI (US); Leonard M. Mallak, Milwaukee, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 09/616,211

(22) Filed: Jul. 14, 2000

(51) Int. Cl.[7] .............................. F16B 21/18
(52) U.S. Cl. .................. 411/517; 411/530; 411/438; 411/526; 411/278; 24/27
(58) Field of Search ................ 411/277, 278, 411/280, 516–519, 530, 339, 438, 525, 526, 529; 285/244; 24/27

(56) References Cited

U.S. PATENT DOCUMENTS

| 972,372 A | 10/1910 | Harding |
|---|---|---|
| 1,137,416 A | 4/1915 | Mumford |
| 1,267,656 A | 5/1918 | Goserud |
| 2,387,257 A | 10/1945 | Haas |
| 2,497,550 A | * 2/1950 | Jeffries |
| 2,629,908 A | 3/1953 | Keck |
| 2,794,475 A | 6/1957 | Pachmayr |
| 2,829,908 A | 4/1958 | Brochette et al. |
| 2,936,625 A | * 5/1960 | Heiseler |
| 3,213,499 A | 10/1965 | Zylstra |
| 3,440,335 A | 4/1969 | Blomstrand |
| 3,589,423 A | 6/1971 | Metz |
| 3,905,411 A | * 9/1975 | Dzus |
| 4,569,105 A | 2/1986 | Weider |
| 4,622,719 A | * 11/1986 | Rasmussen |
| 4,699,404 A | 10/1987 | Drevs |
| 5,449,259 A | 9/1995 | Clohessey |

FOREIGN PATENT DOCUMENTS

| CH | 596456 | * 3/1978 | .............. 24/27 |
|---|---|---|---|
| DE | 347859 | 1/1922 | |
| DE | 1046411 | 12/1958 | |
| FR | 1270679 | 7/1961 | |
| FR | 2518196 | 6/1983 | |
| GB | 192168 | * 1/1923 | .............. 285/244 |

OTHER PUBLICATIONS

Emhart, HeliCoil Screw Thread Inserts, www.emhart.com, Mar. 2000, 3 pgs.
ITW Shakeproof, Shakeproof Solutions, Collet Clamp brochure, (compares prior art to present invention) 1 pg.

* cited by examiner

Primary Examiner—Flemming Saether
(74) Attorney, Agent, or Firm—Fletcher, Yoder & Van Someren

(57) ABSTRACT

A spring collet clamping system and method therefor including a collet disposed about a shaft, for example a rotary motor shaft, a substantially balanced spring clamp having a coil portion with arms extending from generally opposite portions thereof, the coil portion of the spring clamp is disposed about a portion of the collet, for example resilient arms thereof, to constrict and clamp the collet about the shaft.

19 Claims, 1 Drawing Sheet

SPRING COLLET CLAMP AND METHOD

BACKGROUND OF THE INVENTION

The invention relates generally to spring collet clamps and methods therefor.

Coil spring clamps are known generally and used widely, for example to clamp collets about rotating motor shafts, among many other applications.

An object of the present invention is to provide in some embodiments thereof novel spring collet clamps and methods therefor that overcome problems in and improve upon the prior art.

Another object of the invention is to provide in some embodiments thereof novel spring collet clamps and methods therefor that are economical.

Another object of the invention is to provide in some embodiments thereof novel spring collet clamps and methods therefor having improved reliability.

Another object of the invention is to provide in some embodiments thereof novel spring collet clamps and methods therefor that are more easily installed.

Another object of the invention is to provide in some embodiments thereof novel spring collet clamps and methods therefor that do not require tools for installation.

Another object of the invention is to provide in some embodiments thereof novel spring collet clamps and methods therefor that are adaptable to automation.

Another object of the invention is to provide in some embodiments thereof novel spring collet clamps and methods therefor that do not require counterbalancing.

A further object of the invention is to provide in some embodiments thereof novel spring collet clamps and methods therefor that are substantially balanced, for example when installed about a rotating shaft.

Another object of the invention is to provide in some embodiments thereof novel spring collet clamps and methods therefor that do not require angular positioning during installation.

Another object of the invention is to provide in some embodiments thereof novel spring collet clamps and methods therefor that do not deform during installation and/or use.

Another object of the invention is to provide in some embodiments thereof novel spring collet clamps and methods therefor that are reusable.

A further object of the invention is to provide in some embodiments thereof novel spring collet clamps and methods therefor having improved resistance to axial pull-off forces.

A more particular object of the invention is to provide in some embodiments thereof novel spring collet clamping systems comprising a collet disposed about a shaft, a spring clamp having a coil portion with arms extending from generally opposite portions thereof, the coil portion of the spring clamp disposed about a portion of the collet thereby clamping the collet about the shaft.

Another more particular object of the invention is to provide in some embodiments thereof novel motor shaft collet spring clamping systems comprising a collet disposed about a rotatable motor shaft, a balanced spring clamp having a helical coil portion with at least one arm extending therefrom, the helical coil portion of the spring clamp disposed about a portion of the collet to retain the collet about the shaft.

Yet another more particular object of the invention is to provide in some embodiments thereof novel methods for spring clamps comprising assembling an outer member with an axial inner member, for example assembling a collet about a shaft, disposing a helical coil portion of a spring clamp about a non-threaded outer surface portion of the outer member by rotating the spring clamp, and clamping the outer member about the axial inner member with the spring clamp.

These and other objects, aspects, features and advantages of the present invention will become more fully apparent upon careful consideration of the following Detailed Description of the Invention and the accompanying Drawings, which may be disproportionate for ease of understanding, wherein like structure and steps are referenced generally by corresponding numerals and indicators.

DETAILED DESCRIPTION OF THE INVENTION

Figure 1:
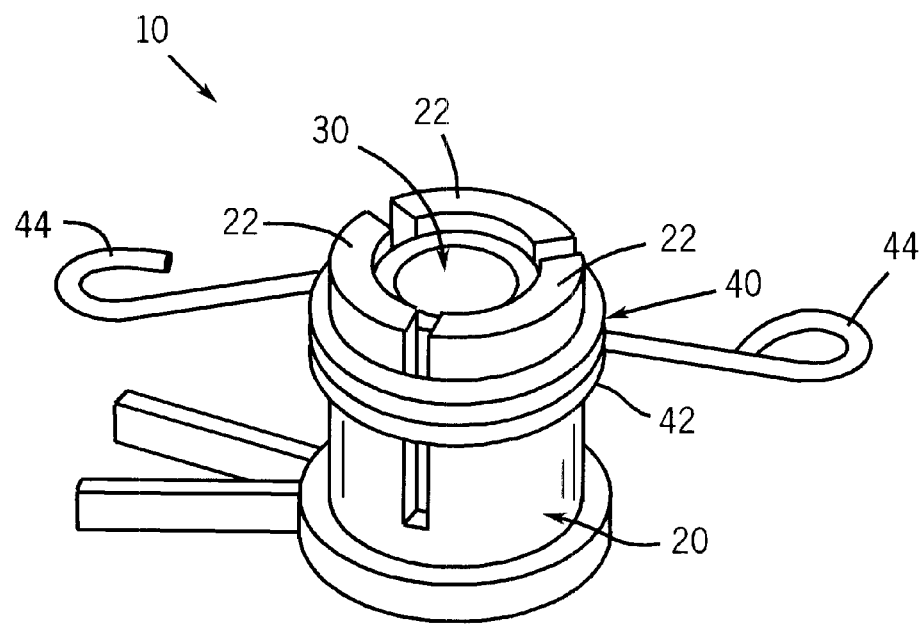
FIG. 1 is a spring collet clamp according to an exemplary embodiment of the invention.

FIG. 1 illustrates a spring collet clamping system 10 comprising an outer member, for example a collet 20, disposed about an axial inner member, for example a rotatable shaft 30 of an electric motor, and a spring clamp 40 disposed about a portion of the collet to clamp the collet to the motor shaft.

The collet may take many forms, but its structure preferably has a portion that is capable of constriction about the axial inner member, or shaft, disposed in an axial opening of the collet, so that the collet or a portion thereof may be constricted about the shaft, thereby axially retaining the collet relative to the shaft.

The exemplary collet 20 of FIG. 1 comprises a plurality of at least two resilient fingers 22 separated by slots disposed about an axial opening thereof into which the shaft 30 is disposed. The resilient fingers 22 are flexible to constrict the about the shaft upon application of a radially inwardly directed force about a portion thereof by the spring clamp.

The portion of the collet about which the spring clamp is disposed to constrict the resilient fingers is preferably a non-threaded outer surface portion thereof, as illustrated in FIG. 1.

The exemplary collet 20 is preferably a unitary member formed of a plastic material, for example in a molding operation, but in other embodiments the collet may be formed of other materials in other manufacturing operations.

In FIG. 1, the spring clamp 40 generally comprises a helical coil portion 42 having a plurality of helical coils with at least one arm extending therefrom.

In one embodiment, the spring clamp is preferably substantially balanced about the axis of the helical coil portion, which is desirable for applications where the spring clamp retains a collet or other member about a rotating shaft, as in the exemplary electric motor application. The balanced spring clamp eliminates or at least substantially reduces the need for re-balancing the collet after installation of the spring clamp thereabout.

In the exemplary embodiment, the balanced spring clamp comprises two arms 44 extending from generally opposite portions thereof. The arms of the spring clamp are also preferably disposed substantially transversely to an axis of the helical coil, and are generally offset axially by the helical portion 42 of the spring clamp, although the arms 44 may be configured to converge toward each other. The balanced configuration of the spring clamp is exemplary, and those having ordinary skill in the art will appreciate that there are other arm configurations that will result in a balanced spring clamp.

The helical coil portion 42 of the spring clamp has an inner diameter that is smaller than an outer diameter of the portion of the collet about which the spring clamp is disposed. In the exemplary embodiment, the inner diameter of the helical portion of the spring clamp is smaller than the outer diameter of a portion of the resilient fingers of the collet. Thus when the helical portion of the spring clamp is disposed about the collet, the spring clamp constricts the resilient arms, thereby securely clamping the collet to the shaft.

The spring clamp is preferably a unitary member, formed for example of a spring steel wire segment having a helically coiled intermediate portion forming the helical coil portion 42 and opposite end portions extending therefrom forming the arms 44.

Figure 2:
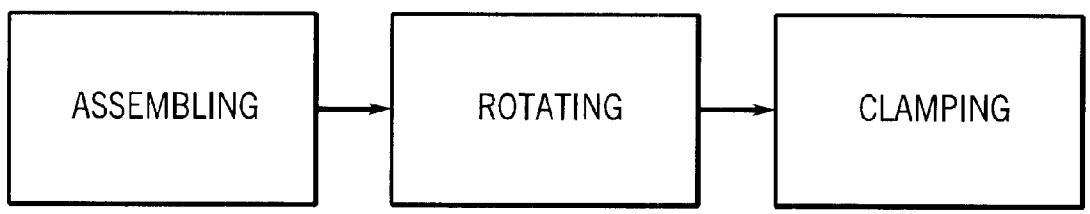
FIG. 2 is a process flow diagram for installation of a spring collet clamp.

In the process diagram FIG. 2, the collet and shaft are first assembled, for example the collet is disposed about the shaft, or the shaft is inserted into the axial opening of the collet.

Thereafter, the spring clamp 40 is installed about the collet, and more particularly in the exemplary embodiment the helical portion 42 of the collet is disposed about the non-threaded outer surface portion of the resilient arms 22 by rotating the spring clamp.

As noted above, prior to installation, the inner diameter of the helical coil portion of the spring clamp is generally smaller than the outer diameter of the portion of the collet about which the spring clamp is disposed. In some embodiments, one or both of the collet and spring clamp may have a tapered lead-in surface or edge to facilitate the initial assembly of these components having disparate diameters.

The spring clamp 40 is preferably rotated in a direction that enlarges an inner diameter of the helical coil portion thereof, and more particularly the spring clamp is rotated in a direction opposite to the direction of winding of the helical coil portion. Such rotation will tend to radially enlarge the inner diameter of the helical coil portion 42, thus permitting axial displacement thereof about the outer portion of the collet.

Rotation of the spring clamp will also tend to axially advance the spring clamp along the collet, although in some applications it may be desirable to apply an axial force to the spring clamp during the rotation thereof to facilitate axial positioning of the spring clamp.

The spring clamp may be rotated by applying a force to one or both of the two generally radial arms 44 extending therefrom.

Upon cessation of rotation of the spring clamp about the collet, and axially locating the spring clamp to its desired position, the helical portion 42 of the spring clamp will tend toward its original diameter, applying a radially inwardly directed force about the collet. In the exemplary embodiment, the spring clamp constricts the resilient fingers of the collet about the shaft, thereby securing the collet thereto.

While the foregoing written description of the invention enables one of ordinary skill to make and use what is considered presently to be the best mode thereof, those of ordinary skill will understand and appreciate the existence of variations, combinations, and equivalents of the specific exemplary embodiments herein. The invention is therefore to be limited not by the exemplary embodiments herein, but by all embodiments within the scope and spirit of the appended claims.

What is claimed is:

1. A spring collet clamping system comprising:
    a rotatable shaft;
    a collet disposed about the rotatable shaft; and
    a reusable spring clamp having a generally cylindrical, three-turn helical portion with arms extending from generally opposite portions thereof, and an inner diameter of the coil portion being smaller than an outer diameter of the collet, the spring clamp being substantially balanced about an axis of the coil portion and being rotatable by force against the arms to enlarge the inner diameter of the coil portion, and releasable to allow radial contraction of the spring portion on the collet;
    whereby when the generally cylindrical, helical coil portion of the spring clamp is disposed about a portion of the collet the collet is clamped about the rotatable shaft for rotation therewith, balanced by the arms.

2. The system of claim 1, the portion of the collet about which the coil portion of the spring clamp is disposed includes a plurality of at least two resilient fingers disposed about an axial opening of the collet, the coil portion of the spring clamp constricts the resilient fingers of the collet about the shaft.

3. The system of claim 1, the portion of the collet about which the coil portion of the spring clamp is disposed is a non-threaded outer surface portion of the collet.

4. The system of claim 1, the coil portion of the spring clamp has an inner diameter smaller than an outer diameter of the portion of the collet about which coil portion of the spring clamp is disposed.

5. The system of claim 1, the coil portion of the spring clamp comprises a plurality of helical coils.

6. A motor shaft collet spring clamping system comprising:
    a rotatable motor shaft;
    a collet disposed about the shaft; and
    a reusable spring clamp having a generally cylindrical, helical coil portion with a pair of arms extending from generally opposite portions thereof in opposite directions away from a central axis of the coil portion, an inner diameter of the coil portion being smaller than an outer diameter of the collet, the spring clamp being substantially balanced about an axis of the coil portion and being rotatable by force against the arms to enlarge the inner diameter of the coil portion, and releasable to allow radial contraction of the spring portion on the collet;
    the spring clamp substantially balanced about an axis of the generally cylindrical, helical coil portion;
    the generally cylindrical, helical coil portion of the spring clamp disposed about a portion of the collet for rotation with the collet, balanced by the arms;
    the collet retained about the shaft by the spring clamp.

7. The system of claim 6, the spring clamp comprises two arms extending from substantially opposite portions of the helical coil portion.

8. The system of claim 7, the arms of the spring clamp are disposed substantially transversely to an axis of the shaft.

9. The system of claim 6, the portion of the collet about which the helical coil portion of the spring clamp is disposed includes a plurality of at least two resilient fingers disposed about an axial opening of the collet, the helical coil portion of the spring clamp constricts the resilient fingers of the collet about the rotatable shaft.

10. The system of claim 6, the portion of the collet about which the helical coil portion of the spring clamp is disposed is a non-threaded outer surface portion of the collet.

11. The system of claim 6, the helical coil portion of the spring clamp has an inner diameter smaller than an outer diameter of the portion of the collet about which coil portion of the spring clamp is disposed.

12. The system of claim 6, the spring clamp comprises a unitary segment of spring steel having a helically coiled intermediate portion forming the helical coil portion of the spring clamp and opposite end portions forming the arms thereof.

13. A method for securing an outer member to a rotatable member via a spring clamp comprising:

assembling a generally cylindrical, helical outer member with a rotatable axial inner member, the outer member disposed about the axial inner member;

disposing a generally cylindrical, helical coil portion of a spring clamp about a non-threaded outer surface portion of the outer member by rotating the spring clamp, the spring clamp having a coil portion with arms extending from generally opposite portions thereof in opposite directions away from a central axis of the coil portion, an inner diameter of the coil portion being smaller than an outer diameter of the outer member, the spring clamp being substantially balanced about an axis of the coil portion and being rotatable by force against the arms to enlarge the inner diameter of the coil portion, and releasable to allow radial contraction of the spring portion on the outer member;

clamping the outer member about the axial inner member with the spring clamp to enable the outer member to rotate with the axial inner member, balanced by the arms.

14. The method of claim 13, rotating the spring clamp in a direction that enlarges an inner diameter of the helical coil portion thereof.

15. The method of claim 14, rotating the spring clamp by applying a force to one of two generally radial arms extending from generally opposite portions of the helical coil portion thereof.

16. The method of claim 13, the outer member is a collet having a plurality of resilient arms disposed about an axial opening thereof, the axial inner member is a shaft, disposing the shaft in the axial opening of the collet, clamping the collet about the shaft by constricting the resilient arms of the collet about the shaft with the helical coil portion of the spring clamp.

17. The method of claim 16, rotating the spring clamp in a direction that enlarges an inner diameter of the helical coil portion thereof.

18. The method of claim 17, rotating the spring clamp by applying a force to one of two generally radial arms extending from generally opposite portions of the helical coil portion thereof.

19. The method of claim 17, applying an axial force to the spring clamp while rotating it.

\* \* \* \* \*